July 28, 1931.　　　　　C. B. GRAY　　　　　1,816,648
PUNCH CONNECTING MECHANISM
Filed Nov. 9, 1928
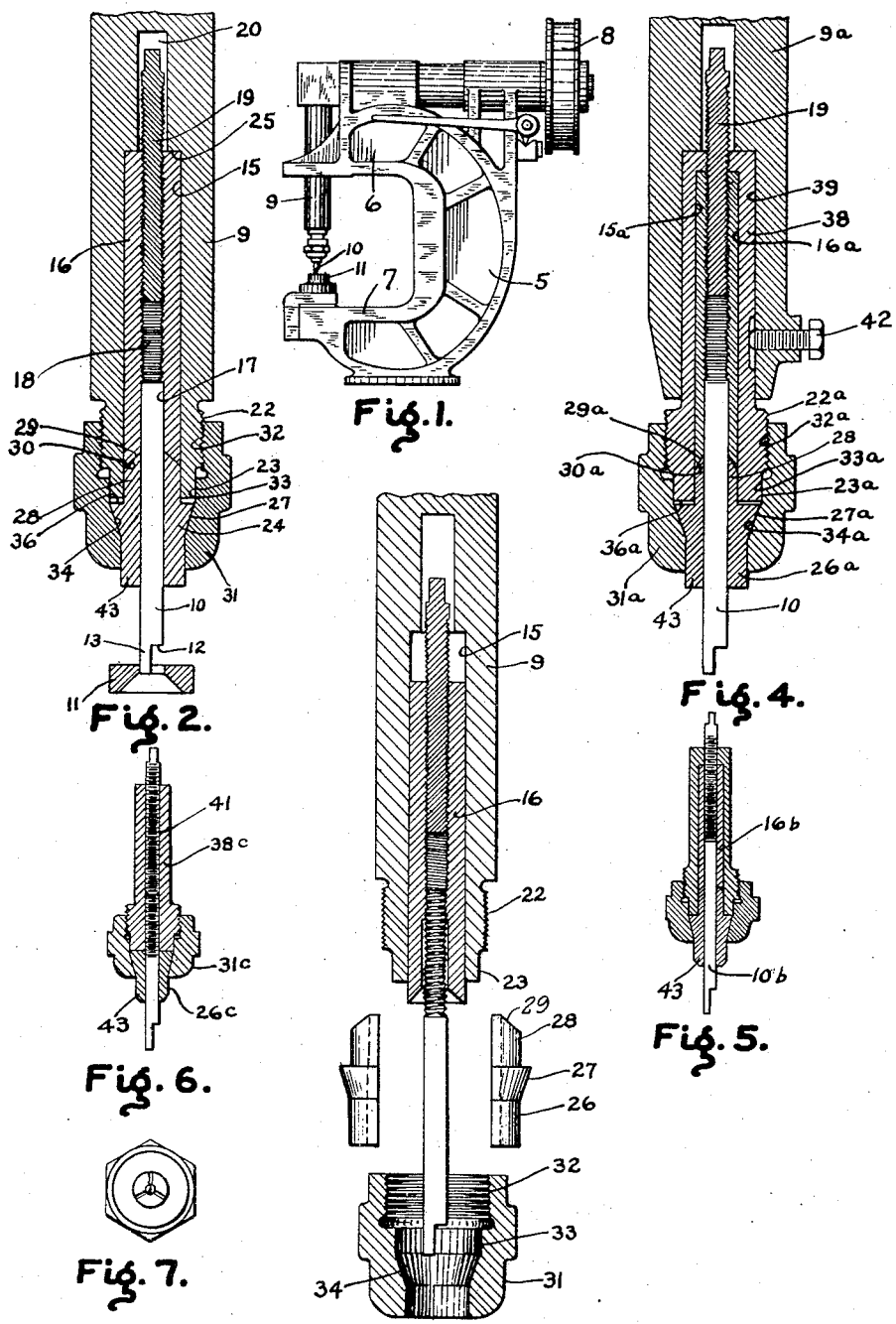

Patented July 28, 1931

1,816,648

UNITED STATES PATENT OFFICE

CHARLES B. GRAY, OF MILLBOURNE, PENNSYLVANIA

PUNCH CONNECTING MECHANISM

Application filed November 9, 1928. Serial No. 318,282.

My invention relates to cutting or slotting machines of the shear type.

With machines of the step-by-step cutting type for cutting or slotting material, such as sheet or plate metal, and employing a tool carried by a reciprocatory ram, it is desirable that the tool be firmly and securely connected to its carrying part and that the tool be alined with its die. Ordinarily, if care is not observed in fitting a tool it may not properly aline with its die with the result that breakage may occur. Accordingly, therefore, it is an object of my invention to provide a fastening which not only firmly secures the tool in place but one which, when being tightened, centers the tool with respect to the die so that registration of the tool and of the die is secured and maintained.

In accordance with my invention, I provide a reciprocatory ram having an improved form of connection or holding means for a cutting tool. Compressive stress is imposed on the top of the tool during working or cutting strokes by abutment means providing for longitudinal adjustment of the tool and tension stress is exerted on the tool by collet mechanism during back strokes of the tool, the collet mechanism also serving to maintain the tool centered both during working and back strokes. A further object of my invention is to provide tool holding means of this character.

A further object of my invention is to facilitate the insertion of tools in machines of the character referred to with assurance of correct centering.

These and other objects are effected by my invention as will be apparent from the following description and the accompanying drawings, forming a part of this application, in which:

Fig. 1 is a side elevational view having my improvement applied thereto;

Fig. 2 is a fragmentary sectional view of the ram and tool holding means employed in Fig. 1;

Fig. 3 is an exploded sectional view of the parts shown in Fig. 2;

Figs. 4, 5, and 6 are sectional views showing modified forms of my invention; and Fig. 7 is an inverted plan view of apparatus made in accordance with Fig. 6.

Referring now to the drawings more in detail, I show a frame 5 having upper and lower arms 6 and 7. A drive shaft having a pulley 8 reciprocates a ram 9 in a well known manner, the ram carrying a tool 10 cooperating with a die 11 carried by the lower arm 7.

The tool 10 has a cutting or shearing portion 12 and a pilot portion 13. As will be pointed out, the ram 9 is arranged to hold the tool in alinement with the die and the particular fastening means for the tool facilitates the accomplishment of this purpose.

In Fig. 2, I show a ram 9 having a longitudinal bore 15 coaxial with the opening of the die 11. A sleeve or bushing 16 is arranged to fit accurately the bore 15. The shank of the tool 10 fits the bore 17 of the sleeve or bushing and it is preferably threaded to the latter as shown at 18. A follower 19 is threaded to the bushing bore and it abuts the upper end of the tool shank to securely lock the latter in place with respect to the bushing. The tool 10 may be adjusted with respect to the bushing, or it may be replaced in the latter; and, after the desired adjustment is secured, the follower 19 is screwed down to jam against the upper end of the tool to lock the latter in place with respect to the bushing. As the follower 19 extends above the bushing 16, the ram is counterbored at 20 to receive the projecting end.

The lower end of the ram 9 is provided with a threaded portion 22 and a bearing portion 23 arranged below the threaded portion, both portions 23 and 22 being coaxial with the opening of the die 11. With the bushing and tool assembly inserted in the ram bore 15, a collet 24 is arranged to engage the lower end of the bushing 16 to hold the latter, with the tool, firmly in place, the upper end of the bushing abutting the upper end or shoulder 25 of the bore. The collet preferably includes a plurality of complementary parts or segment 26, which are arranged to surround and to grip the tool.

The collet parts or segments 26 are so formed as to provide an outer conical surface 27 for a purpose to be described; and, above the conical surface 27, there are extensions 28 arranged to fit closely the interior of the bore 15. The extensions are provided at their upper ends with elements of a conical surface 29 arranged to engage the lower end conical surface 30 of the bushing.

The collet sleeve 31 has interior threads 32 for engagement with the ram threads 22, it has a bearing portion 33 accurately fitting the bearing portion 23 of the ram, and it has a conical bearing or seat portion 34 coaxial with the bearing portion 33. The sleeve 31 is maintained coaxial with the opening of the die due to the cooperating bearing surfaces 23 and 33; and, when such sleeve is screwed up, it exerts a wedging action on the collet segments 26 causing the latter to move inwardly uniformly so as to clamp the tool coaxially with respect to the opening of the die. Before the wedging action just referred to commences, the extensions 28 enter the ram bore and the conical surface elements 29 thereof engage the lower conical surface 30 of the bushing, causing the latter to abut the shoulder 24, and then the conical surfaces 27 and 34 come into play to secure the gripping action. Due to the cooperating and accurately fitting bearing surfaces 23 and 33, the sleeve 31 exerts a centralizing action on the tool to locate the latter positively coaxially with respect to the opening of the die 11.

The tool and bushing assembly may be readily removed from the ram bore 15 after removal of the sleeve 31. The tool 10 may be replaced or adjusted in the bushing, the follower 19 being suitably adjusted to give the correct position for the cutting end of the tool.

If it is desired to use a tool 10 of larger or smaller diameter, this may be done by choosing a bushing having a suitable bore, it being convenient to have bushings adapted to fit the ram bore and having a wide range of bore diameters. Of course, if the tool diameter is changed, a die having a suitable opening must also be selected.

From the structure so far described, it will be seen that the ram 9 not only serves its usual purpose but that it has been particularly modified to function as a tool holder. The sleeve 31 causes the collet segments to grip the tool; and also, as the tool is threaded to the bushing bore, clamping of the bushing by the sleeve and the segments serves as an additional means for holding the tool in place with respect to the ram. To assure that the segment extensions shall engage the lower end of the bushing, suitable clearance is provided, as indicated at 36, between the collet segments and the lower end of the ram.

With the form of my invention shown in Figs. 1, 2, and 3, on working strokes, compressive stress is applied to the upper end of the tool 10 by the threaded plug or follower 19. On back strokes, pull or tension is exerted by the collet mechanism and by the threaded tool connection; however, as shown in Fig. 5, threads on the tool may be omitted, gripping action of the collet mechanism being quite sufficient to secure withdrawal of the tool on back strokes. Hence, the holder embodies two connections, a compressive one effective on working strokes and including an adjustable abutment, the plug 19, and a tension one effective on back strokes and embodying collet mechanism, which serves not only this purpose but also to maintain the tool centered with respect to the die.

In Figs. 4 to 7, inclusive, I show a modified form of my invention wherein the tool holder 38 is arranged to fit a ram bore 39 and wherein the holder is provided with a tool adjustably connected thereto, as hereinbefore described.

In Figs. 4 and 5, the tool holder 38 is provided with a bore 15a to receive the bushing 16a, the latter having a tool 10 and a follower 19, threaded to the bore of the bushing as in Fig. 1. The holder has a threaded portion 22a and a bearing 23a with which cooperate the threaded portion 32a and the bearing portion 33a of the collar or sleeve 31a. As in Fig. 1, the collar or sleeve 31a is provided with an interior conical surface 34a cooperating with conical surface elements 27a provided on the collet segments 26a. Also the collet segments 26a are provided with extensions 28a having cylindrical surface elements arranged to fit the interior of the bore 15a and having convex conical end surface elements 29a arranged to fit the concave surface 30a at the lower end of the bushing 16a. Clearance space is provided at 36a between the lower end of the holder body 38 and the portions of the collet segments having the conical surface elements so that, when the collar or sleeve 31a is screwed up, the collet segments 28a are pulled up to clamp the bushing 16a in place in the bore 15a. Further upward movement of the sleeve or collar 31a results in the interior conical surface 34a acting on the conical surface elements 27a of the collet segments to cause the latter to move inward radially to grip the tool. Since the bore 15a, the threaded portion 22a and the bearing portion 23a of the holder or body member 38, the peripheral surface and the bore of the bushing 16a, the exterior surface elements of the collet segments 26a, and the interiorly threaded portion 32a, the bearing portion 23a, and the interior conical surface 34a of the sleeve or collar 31a are all coaxial, the cooperating bearing surfaces 23a and 33a assure that, when the collar or sleeve 31a is tightened, the tool 10 will be gripped and forced to occupy a position coaxial with the holder or body member 38 in which position the tool 10 properly alines with a cooperating die. The cylindrical and conical surface elements of the collect extensions 28a assist in the centering of the collet segments.

The construction shown in Fig. 5 is similar to that shown in Fig. 4 except that the shank of the tool 10b is not threaded to the bore of the bushing 16b, the connection of the tool to the holder or body member being entirely due to the gripping action of the collet segments. The features of centering and gripping are similar to those already described in connection with Figs. 2 and 4.

In Fig. 6, I show a holder or body member 38c having an interiorly threaded bore having engaging therewith the threaded portion of the shank of a tool 10 and the follower 19. Since the tool fits the bore of the body member or holder 38c, the upper ends of the collet segments 26c abut against the lower end of the body member or holder. The collar or sleeve 31c cooperates with the body member or holder and with the collet segments to secure centering and gripping as heretofore described.

Where the tool is carried by a body member or holder formed separately from the ram, such holder or body member is connected to a ram. Referring again to Fig. 4, I show a ram 9a having a bore 39 to receive the holder or body member 38 and the latter is held in place in the bore by any suitable means, for example, by a set screw 42 carried by the ram 9a and engaging said holder or body member 38. The terms "holder" or "body member" are used herein to cover such structure whether formed as a part of the ram or separate therefrom and connected thereto.

From the foregoing, it will be apparent that I have provided means for directly connecting the shearing tool or punch of a step-by-step cutting or slotting machine directly to the ram, such means serving to center the tool or to bring it into alinement with the cooperating die. The means for doing this preferably takes the form of a collet mechanism including segments arranged to contact with a bushing to which the tool is connected, whereby, when the sleeve or collar of such mechanism is tightened, the bushing is clamped in place with respect to the ram, thereby connecting the tool to the ram, and further tightening of the sleeve or collar results in inward radial movement of the collet segments to grip the tool, thereby providing a second means for connecting the tool to the ram. Since the ram bore and the threaded and bearing portions of the ram, the bushing exterior and bore, the gripping surface elements and the external surface elements of the collet segments, and the threaded portion, the cylindrical bearing portion, and the interior conical surface of the sleeve or collar are all coaxial with the opening of the die, it is assured that the tool will occupy such coaxial position due to the accurately formed and fitting cylindrical bearing surfaces provided at the lower end of the ram and interiorly of the sleeve or collar. In this way, the interior conical surface of the sleeve or collar is brought into coaxial position and the collet segments are acted on to cause the tool to occupy the coaxial position. Preferably, the collet segments fit the interior of the ram bore and have conical surface elements at their upper ends cooperating with a conical surface provided at the lower end of the bushing, these features assisting in the centering action incident to gripping of the tool by the segments. The bushing and tool assembly may be removed merely by unscrewing the sleeve or collar. Also tools of different sizes may be used in connection with the ram, the only requirement being that the bushings thereof fit the ram bore. Bushings and collet segments are provided for the range of tools, all of the bushings having the same external diameter and the collet segments having the same external diameter, each tool being provided with a bushing and collet segments suitable to the size thereof.

While I prefer to employ my improved tool fastening and centering means for connecting a tool directly to a ram, as shown in Figs. 1, 2, and 3, yet the fastening and centering features may be employed advantageously with a tool holder or body member formed separately from the ram, as shown in Figs. 4, 5, and 6. All of the forms have the advantage that the collet mechanism positively centers or alines the tool with respect to the cooperating die.

While I show a collet mechanism including segments, it will be apparent that any suitable gripping means for the tool may be employed so long as it operates to center the tool as an incident to being brought into gripping relation.

With a tool of the character referred to, the compressive stresses to which it is subjected in operation are severe. Hence a further object and feature of the invention is to reinforce the tool so far as possible to resist deflecting or buckling and consequent breakage. In all of the modifications, the shank of the tool is closely surrounded by structure resisting buckling or deflection between the collet and the upper end; as already pointed out, the collet closely grips the shank; and the collet segments extend down through and below the collar so as to be as close as is practicable to the punch end of the tool, such extensions reinforcing the tool and serving to resist deflection or buckling thereof. The reinforcing extensions are shown at 43 on the drawings.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In holder mechanism for a reciprocatory tool, a body member construction having an axial bore, a tool disposed in the bore, means for transmitting compressive stress from the body member construction to the tool on working strokes including an adjustable abutment engaging the upper end of the tool and providing for longitudinal adjustment of the tool relatively to the body member construction, and means for exerting tension stress on the tool on back strokes and for maintaining the tool centered on working and back strokes including a cylindrical bearing portion at the lower end of the body member construction and a body member construction threaded portion of larger diameter than the bearing portion and arranged above the latter, a segmental collet abutting against the lower end of the body member construction and having interior cylindrical and exterior upwardly flaring conical surfaces coaxial with the bore and the body member construction bearing portion, and a collar having coaxial interior conical, cylindrical bearing, and threaded portions engaging the collet conical surface, the body member construction bearing portion, and the body member construction threaded portion, the collet being rendered effective to establish the gripping and centering relation by screwing up the collar and the connection being constructed and arranged to provide said gripping and centering relation before the limit of screwing-up range of the collar is reached.

2. In a machine for cutting or slotting material, the combination of a body member construction having a tool-receiving bore open at one end of the construction, a cylindrical peripheral bearing surface at the bore end of the construction, and a peripheral threaded portion of larger diameter than that of the bearing surface and disposed inwardly from the latter; a tool whose shank is contained within said bore, collet segments abutting said construction and having interior tool gripping surface elements and exterior conically surfaced elements flared only toward said bearing surface and terminating adjacent to the latter; and a collar having an interior conical surface for engagement with the conical surface elements of the collet segments, an interior cylindrical bearing surface accurately fitting the cylindrical bearing surface of said construction, and a threaded portion engaging the threaded portion of said construction the shank of the tool being gripped or ungripped by screwing up or unscrewing the collar and the tool shank being gripped before the limit of screwing-up movement is reached; said bore, bearing surface and threaded portion of said construction, the interior gripping surface elements and the exterior conical surface elements of the collet segments, and the interior conical and cylindrical bearing surfaces and the threaded portion of the collar all constructed and arranged to be coaxial, whereby the cooperating cylindrical bearing surfaces of said construction and of the collar serve to center and to aline the tool in the bore.

3. In a machine for cutting or slotting material, the combination of a reciprocatory ram having a cylindrical bore provided with an interior shoulder, an exterior cylindrical bearing surface at its lower end, and an exterior threaded portion of larger diameter than the bearing surface disposed above the latter; a bushing having an external cylindrical surface arranged to fit accurately the ram bore and to have its upper end abut said shoulder and having a bore threaded at least in part; a tool having its shank disposed in the bushing bore; a follower threaded to the bushing bore and engaging the upper end of the tool; collet segments having interior tool-gripping surface elements, exterior conical surface elements, and abutment means for engagement with the lower end of the bushing; and a collar having an interior conical surface for engagement with the conical surface elements of said segments, an interior cylindrical bearing surface accurately fitting the cylindrical bearing surface of the ram, and an interior threaded portion engaging the ram threaded portion, whereby, when the collar is screwed up, the collet segments abut the bushing and grip the tool; said bore, cylindrical bearing surface and threaded portion of the ram, the bore and the external cylindrical surface of the bushing, the tool-gripping and conical surface elements of the collet segments, and the interior conical surface, the interior cylindrical bearing surface and the interior threaded portion of the collar all being constructed and arranged to be coaxial, whereby said cooperating cylindrical bearing surfaces of the ram and of the collar serve to center and to aline the tool in the bore.

4. In a machine for cutting or slotting material, the combination of a reciprocatory ram having a cylindrical bore provided with an interior shoulder, an exterior cylindrical bearing surface at its lower end, and an exterior threaded portion of larger diameter than the bearing surface disposed above the latter; a bushing having an external cylindrical surface arranged to fit accurately the ram bore and to have its upper end abut said shoulder, having a bore threaded at least in part, and having a concave conical surface at its lower end; a tool having a threaded shank engaging the bushing bore threads; a follower having threads engaging the bushing bore threads and abutting with the upper end of the tool; collet segments having interior tool-gripping surface elements, exterior conical surface elements, and extensions having cylindrical surface elements for engagement with the ram bore and upper end convex conical surface elements for engagement with the concave conical surface of the bushing; and a collar having an interior conical surface for engagement with the conical surface elements of said segments, an interior cylindrical bearing surface accurately fitting the cylindrical bearing surface of the ram, and an interior threaded portion engaging the ram threaded portion, whereby, when the collar is screwed up, the extensions of the collet segments are disposed within the ram bore and abut the bushing and the gripping surface elements of such segments grip the tool; said bore, cylindrical bearing surface and threaded portion of the ram, the bore and the external cylindrical surface of the bushing, the tool-gripping and conical surface elements of the collet segments, and the interior cylindrical bearing surface and the interior threaded portion of the collar all being constructed and arranged to be coaxial, whereby said cooperating cylindrical bearing surfaces of the ram and of the collar serve to center and to aline the tool.

5. In apparatus of the character described, the combination of a tool holder including a body member having an axial tool-receiving bore, an external cylindrical bearing surface at one end of the body member, and a threaded portion of larger diameter than the bearing surface; a tool having its shank disposed in said bore; expansible and contractible means having interior tool-gripping and exterior conical surfaces and an exterior cylindrical extension; a collar having a cylindrical opening receiving said extension, and provided with an interior conical surface for engagement with the conical surface of the expansible and contractible means, an interior cylindrical bearing surface fitting accurately the cylindrical bearing surface of the body member, and a threaded portion engaging the threaded portion of the body member; said bore, cylindrical opening, cylindrical extension, cylindrical bearing surface, and threaded portion of the body member, the surfaces of the expansible and contractible means, and the conical and cylindrical surfaces and the threaded portion of the collar all being coaxial, whereby the cooperating cylindrical bearing surfaces of the body member and of the collar serve to center and to aline the tool with respect to the bore of the body member.

6. In apparatus of the character described, the combination of a tool holder including a body member having an axial bore, an external cylindrical bearing surface at its outer end, and being provided inwardly thereof with a threaded portion of larger diameter than the cylindrical bearing surface; a bushing disposed within and fitting the bore of the body member and having a bore which is threaded at least in part; a tool having a shank disposed within the bushing bore; a follower having threads engaging the bushing bore threads and abutting the inner end of the tool shank; expansible and contractible means abutting said bushing to hold the latter in place with respect to the body member and having interior tool-gripping and exterior conical surfaces and an exterior cylindrical extension; a collar having a cylindrical opening receiving said extension, and provided with an interior conical surface for engagement with the conical surface of the expansible and contractible means, an interior cylindrical bearing surface fitting accurately the cylindrical bearing surface of the body member, and a threaded portion engaging the threaded portion of the body member; said bore, cylindrical opening, cylindrical extension, cylindrical bearing surface and threaded portion of the body member, the exterior surface and the bore of the bushing, the inner and outer surfaces of the expansible and contractible means, and the conical and cylindrical surfaces and the threaded portion of the collar all being coaxial, whereby the cooperating cylindrical bearing surfaces of the body member and of the collar serve to center and to aline the tool with respect to the bore of the body member.

7. In apparatus of the character described, the combination of a tool holder including a body member having an axial bore, an external cylindrical bearing surface at its outer end, and being provided inwardly thereof with a threaded portion of larger diameter than the cylindrical bearing surface; a bushing disposed within and fitting the bore of the body member and having a bore which is threaded at least in part; a tool having a shank provided with threads engaging the bore threads; a follower having threads engaging the bore threads and abutting the inner end of the tool shank; collet segments engaging the bushing and havin interior surface elements engaging the tool and having exterior conical surface elements; and an exterior cylindrical extension, and a collar having a cylindrical opening receiving said extension, and provided with an interior conical surface for engagement with the conical surface elements of the collet segments, an interior cylindrical bearing surface fitting accurately the cylindrical bearing surface of the body member; said bore, cylindrical opening, cylindrical extension, cylindrical bearing surface, and threaded portion of the body member, the exterior surface and the bore of the bushing, the tool-gripping and the conical surface elements of the collet segments, and the conical and cylindrical surfaces and the threaded portion of the collar all being coaxial, whereby the cooperating cylindrical bearing surfaces of the body member and of the collar serve to center and to aline the tool with respect to the bore of the body member.

8. In apparatus of the character described the combination of a ram having a bore, a tool holder having a part contained within said bore and provided with a concaved end and means for connecting the punch to the tool holder including collet segments arranged to engage about the shank portion of the punch, to be limited in upward movement by the tool holder, provided with a coned end received in a concaved end of the tool holder and having external conical surface elements, and a collar having a cylindrical opening and also threaded to the tool holder and having an interior conical surface for engagement with the external conical surface elements of the segments to cause the latter to grip the shank portion of the punch; said collet segments having cylindrical shank-engaging portions fitting the cylindrical opening in the collar and extending below the collar a substantial distance to reinforce the shank portion.

In testimony whereof I affix my signature.

CHARLES B. GRAY.